United States Patent [19]
Berg et al.

[11] 3,939,440
[45] Feb. 17, 1976

[54] WOUND RESISTOR-CAPACITOR NETWORK AND METHOD OF FORMING

[75] Inventors: Richard D. Berg, Elmhurst; Donald R. Brown, Downers Grove; Otto T. Masopust, Jr., Bolingbrook, all of Ill.; James F. Stoltz, Cape Coral, Fla.

[73] Assignee: Western Electric Company, Inc., New York, N.Y.

[22] Filed: Dec. 17, 1974

[21] Appl. No.: 533,589

[52] U.S. Cl............. 333/70 CR; 29/605; 333/70 S; 333/79
[51] Int. Cl.² H03H 7/06; H03H 13/00; H01G 4/32; H01C 17/04
[58] Field of Search............ 333/70 R, 70 CR, 70 S, 333/31 C, 79; 317/256, 260; 29/592, 25.41, 605, 25.42

[56] References Cited
UNITED STATES PATENTS

| | | | |
|---|---|---|---|
| 2,216,558 | 10/1940 | Ortlieb | 317/242 |
| 3,786,322 | 1/1974 | Brown et al. | 317/256 |

FOREIGN PATENTS OR APPLICATIONS

| | | | |
|---|---|---|---|
| 743,717 | 1/1956 | United Kingdom | 333/70 R |

*Primary Examiner*—Eli Lieberman
*Assistant Examiner*—Marvin Nussbaum
*Attorney, Agent, or Firm*—D. D. Bosben

[57] ABSTRACT

A wound resistor-capacitor network having stable frequency response over a wide frequency range (e.g., 60 cycles to 100 kilohertz), is produced by forming a pair of aligned circumferentially extending resistance paths in one of two strips of metallized dielectric film. Forming of the resistance paths is accomplished as the two metallized strips are being wound to form an R-C network roll, by removing metal from the one strip along a first line to produce a gap in the metal layer in parallel spaced relationship to an adjacent edge of the film. Subsequently, removal of metal from the first strip also is initiated along a second line spaced inward from the first line, to produce another gap in the metal layer, thereby forming an elongated first path of desired resistance between the two lines. Metal removal along the first line then is temporarily interrupted to provide a lead termination area and a current steering path at the adjacent end of the network roll, on either side of the strip midpoint. Metal removal along a third line in alignment with the first line then is continued until an elongated second path of desired resistance has been formed between the second and third lines, at which time metal removal along the second line is terminated. Lines of metal also may be removed from the second dielectric film to provide a lead termination area and a current steering path at the opposite end of the wound network roll. Preferably, the metal is removed with the split beam of a single laser and the lines of removal are symmetrical on opposite sides of each strip's longitudinal midpoint.

19 Claims, 12 Drawing Figures

WOUND RESISTOR-CAPACITOR NETWORK AND METHOD OF FORMING

BACKGROUND OF THE INVENTION

1. Field of the Invention

This invention relates to a wound R-C network, and more particularly to a wound R-C network which has a stable frequency response over a wide frequency range, and which is compact in size, easy to fabricate and inexpensive to manufacture.

2. Description of the Prior Art

In various types of electrical and electronic circuits, such as telephone switching systems, resistor-capacitor networks have proven to be very effective in protecting relay contacts against degradation due to arcing as a result of electrical surges in the equipment. Typically, in a basic form of relay contact protection, an R-C network is connected across the contacts of a relay coil so that when the contacts open to de-energize the coil, the network shunts the high frequency energy induced by the collapsing electric field of the coil about the contacts, and the energy is absorbed by the capacitor of the network to prevent arcing across the contacts. When the contacts are reclosed to energize the coil, the resistor of the network limits the low frequency energy flow from the capacitor through the contacts, whereby the network again prevents arcing across the contacts.

One form of a wound R-C network which is suited for this basic type of relay contact protection is disclosed in the U.S. pat. No. 3,786,322, issued Jan. 15, 1974, to D. R. Brown et al, in which the network is fabricated so as to have a frequency dependent impedance, in that it exhibits a high impedance at low frequency to limit the energy flow from the capacitor when associated relay contacts close, and a low impedance at high frequency to facilitate absorption of the electrical energy by the capacitor when the contacts open. In this patent, as two metallized dielectric strips are wound to form a resistor-capacitor roll, a serpentine resistance path is formed in the metal layer of each strip by removing lines of metal therefrom. Subsequently, the ends of the network roll are spray soldered, the network roll is wax-impregnated, and electrical lead connections are made at the opposite ends of the roll with end portions of respective ones of the conductive paths, to form the R-C network.

In certain electronic switching system applications, however, the resistor-capacitor networks perform the additional function of generating a waveform which is compared with an optimum waveform to self-test the system continuously during its operation, to insure that the system is functioning properly. Further, because of the high speed at which the electronic system operates, contact protection networks which do not respond electrically in a uniform manner over a wide frequency range, such as 60 cycles to 100 kilohertz, could adversely affect contact make-and-break times, causing the system to malfunction. Accordingly, it is essential that R-C networks for these applications exhibit a uniform degree of capacitance at least at the lower frequencies (e.g., up to 10 kilohertz), where the networks are primarily reactive, and a uniform effective series resistance at the higher frequencies (e.g., above 10 kilohertz), where the networks are primarily resistive.

A highly stable R-C network suitable for this purpose in electronic switching systems is disclosed in the U.S. pat. No. 3,534,248 issued Oct. 13, 1970 to J. C. Houda, Jr. et al, in which the resistance of the network is provided by a prefabricated discrete resistor. The resistor is manually disposed within an elongated aluminum cylinder with a terminating lead of the resistor projecting axially from the cylinder, while the other lead of the resistor is dressed along the outer periphery of the cylinder. A capacitor then is formed about the cylinder by winding layers of dielectric and electrically conductive material about the cylinder, with a first layer of electrically conducting material in electrical contact with the dressed resistor lead. During the winding of the final turns of the capacitor, after the first layer of electrically conducting layers has been terminated, a second terminating lead is manually inserted and secured between adjacent turns of the dielectric material in electrical contact with a second electrically conductive layer of material. A primary object of the subject invention is to provide a wound R-C network which has electrical stability comparable to this discrete resistor-type network, and which is compact in size, easy to fabricate and inexpensive to manufacture.

SUMMARY OF THE INVENTION

In accordance with this invention, a resistorcapacitor network of the type in which alternate layers of dielectric and electrically conductive material are wound in overlapping relationship to form a roll, includes resistance paths formed in at least a first of two layers of convoluted electrically conductive material. The resistance paths extend circumferentially in opposite directions from a lead termination area at one end (layer edge) of the network roll and connect this lead termination area to an inwardly spaced capacitance forming portion of the first layer of electrically conducting material.

Preferably, the resistance paths are formed in a portion of the first layer of electrically conducting material which is in non-overlapped relationship to the second layer of electrically conducting material adjacent the one end of the network roll. A current steering path also is formed in intermediate convolutions of the first layer of electrically conducting material adjacent the one end of the network roll in radially spaced relationship to the center and the outer periphery of the roll, to connect the lead termination area to the resistance paths. Further, the resistance paths are in circumferential alignment, have resistances of equal value, and are of equal length and width. If desired, another current steering path also may be formed in intermediate convolutions of the second layer of electrically conducting material adjacent a second opposite end (layer edge) of the network roll in radially spaced relationship to the center and the outer periphery of the roll.

DETAILED DESCRIPTION

Referring to FIGS. 1 to 4, this invention relates to the fabrication of an R-C network 20 of the type in which alternate first and second strips 21 and 22 of dielectric material and first and second layers 23 and 24 of electrically conductive metal are wound into a network roll 20r. The strips 21 and 22 may be of any flexible dielectric material, such as a polycarbonate, polystyrene or polyester plastic sold under the tradename "Mylar," and the electrically conductive layers 23 and 24 may be any electrically conductive metal such as aluminum, silver, zinc or alloys thereof. Preferably, the metal layers 23 and 24 have been formed directly on the dielectric strips 21 and 22 using metal vapor deposition or sputtering techniques in a known manner, and the disclosed embodiment of the invention is directed to this type of metallized dielectric strip construction. By way of illustration, the dielectric strips 21 and 22 may be polyester plastic film on the order of 250/1,000,000 of an inch thick, having metallized zinc coatings 23 and 24 on the order of 1/1,000,000 of an inch thick.

Figure 2:
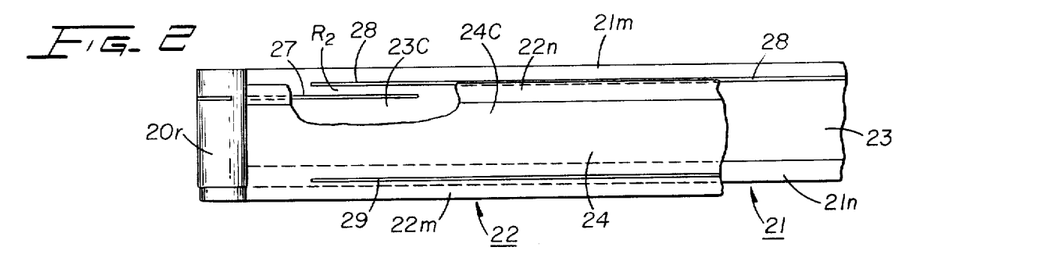
FIG. 2 illustrates the relative positions of layers of dielectric and electrically conducting material in a wound R-C network roll in accordance with the invention.

The metallized dielectric strips 21 and 22 preferably are formed in a known manner from a single metallized strip (not shown) which has been slit longitudinally along a central metallized portion to form the strips, so that the physical and electrical characteristics of both strips are essentially identical, with the metal layers on the strips being uniform in thickness adjacent metallized edges 21m and 22m thereof. In addition, each of the metallized dielectric strips 21 and 22 includes a nonmetallized border 21n and 22n along one edge to preclude the possibility of short circuiting between the metallized portions of the strips when the strips are wound together into the network roll 20r. As a further precaution against shorting between the metallized portions of the dielectric strips 21 and 22, the strips are offset with respect to one another during the winding operation, as is illustrated in FIG. 2.

Figure 3:
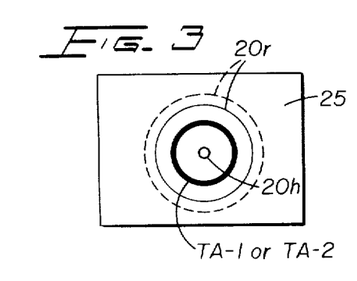
FIG. 3 is a schematic end view of a wound R-C network roll in accordance with the invention, masked for a spray soldering operation.
Figure 4:
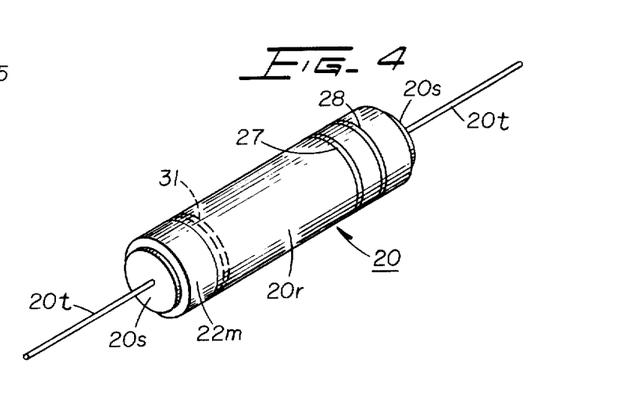
FIG. 4 is an isometric view of a wound R-C network in accordance with the invention.

After the metallized dielectric strips 21 and 22 have been formed into the network roll 20r, the outer turns or convolutions of the network roll 20r are masked adjacent its opposite ends by mask members 25, as illustrated in FIG. 3, and the ends are spray soldered to form porous solder blocks 20s (FIG. 4). The roll 20r then is vacuum impregnated with wax through the porous solder blocks 20s to prevent oxidation of the metal layers 23 and 24 and to fill a center hole 20h in the roll left by a winding arbor. Suitable terminal leads 20t also are attached to the solder blocks 20s in a known manner, as shown in FIG. 4, after which the network 20 may be suitably encapsulated.

During the forming of the network roll 20r, a system of three demetallized lines or gaps 26, 27 and 28 are formed in the first metal layer 23 on the first dielectric strip 21 adjacent the metallized edge 21m thereof, and thus, adjacent one end of the network roll, to define a lead termination area TA-1, a pair of elongated resistance paths $R_1$ and $R_2$, and a current steering path CS-1 connecting the lead termination area and the resistance paths. The resistance paths $R_1$ and $R_2$ extend circumferentially from the current steering path CS-1 in opposite directions and connect the lead termination area TA-1 to an inwardly spaced capacitance forming portion 23C of the metal layer 23.

Preferably, the first and third lines or gaps 26 and 28 extend from respective opposite ends of the metal layer 23 in circumferential alignment and are spaced apart substantially equally (i.e., symmetrically) on opposite sides of the layer's longitudinal midpoint or transverse centerline 23mp to define the lead termination area TA-1 and the current steering path CS-1. Similarly, the second line or gap 27 preferably extends from points which are spaced substantially equally from the opposite ends of the metal layer 23 and thus essentially symmetrically on opposite sides of the layer's longitudinal midpoint 23mp, parallel to portions of the first and third lines 26 and 28 and opposite the current steering path CS-1, to define the resistance paths $R_1$ and $R_2$. As a result, the resistance paths $R_1$ and $R_2$ are equal in length and width and, assuming uniform resistivity in the first metal layer 23 along its length, have resistances of equal value. In this regard, the resistance value of each of the resistance paths $R_1$ and $R_2$ depends upon the resistivity of the metal in the metal layer 23, and the thickness, width and length of the metal path. Accordingly, since in any particular instance a selected width and thickness of the metal layer 23 will have a certain resistivity for a unit of length, which can be readily computed or measured, the length of the resistance path $R_1$ or $R_2$ needed to produce a resistance of a desired value can readily be determined in a manner apparent to those skilled in the art.

Where extremely stable electrical response at high frequencies is required, it also may be necessary to provide the second metal layer 24 on the second dielectric strip 22 with a lead termination area TA-2 and a current steering path CS-2 corresponding to the lead termination area TA-1 and the current steering path CS-1, respectively, in the first metal layer 23. In the disclosed embodiment of the invention, this is accomplished by forming two lines or gaps 29 and 31 in the second metal layer 24, corresponding to the lines or gaps 26 and 28 formed in the first metal layer 23, as above described.

Figure 5:
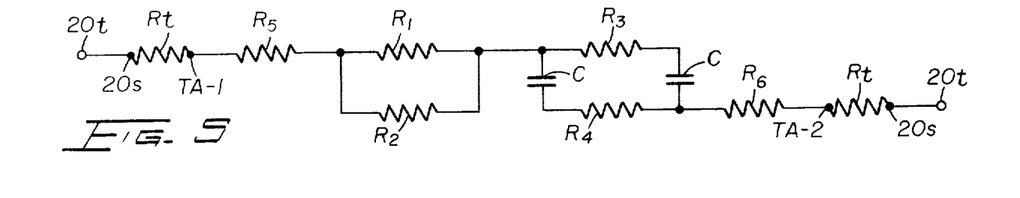
FIG. 5 is an electrical circuit equivalent of the wound R-C network shown in FIG. 4.

The electrical circuit equivalent of the resultant R-C network 10 is illustrated schematically in FIG. 5, with the equal resistances $R_1$ and $R_2$ in parallel, and with a third resistance $R_3$, representing the resistance of the first metal layer 23 inward of the lines or gaps 26, 27 and 28, in series with these resistances and capacitively coupled to a fourth resistance $R_4$, representing the resistance of the portion of the second metal layer 24 inward of the lines or gaps 29 and 31. The resistances $R_1$ and $R_2$ also are connected to the lead 20t for the first lead termination area TA-1 in series with a resistance $R_5$ representing the current steering path CS-1, and a termination resistance $R_t$ between the lead termination area and its solder block 20s. Similarly, the resistance $R_4$ is connected to the second lead 20t at the opposite end of the network 20 in series with a resistance $R_6$ representing the current steering path CS-2 and a second termination resistance $R_t$. The resistances $R_3$ and $R_4$ are small in comparison to the resistances $R_1$ and $R_2$ so that, while representing surface areas of slightly different size, from a practical standpoint they are equal in value. The resistances $R_5$ and $R_6$ also are of equal value, but are negligible in comparison to the combined resistance of the resistances $R_1$–$R_4$. Further, the termination resistances $R_t$ also are of equal but negligible value, providing the solder blocks 20s have been properly formed on the network roll 20r, as above described.

Referring to FIG. 3, it is seen that in the illustrated embodiment of the invention, when the dielectric strips 21 and 22 and the metal layers 23 and 24 are wound into the network roll 20r, the lead termination areas TA-1 and TA-2 defined by the lines or gaps 26, 27, 28 and 29, 31 (FIG. 1) become located in radially spaced intermediate relationship to the center and the outer periphery of the roll. This is desirable from the standpoint of attaining good electrical connections between the solder blocks 20s and the lead termination areas TA-1 and TA-2, as compared to a construction in which the lead termination areas are located at the center of the network roll, which consists essentially of the arbor hole 20h impregnated with wax, as described hereinabove. Similarly, if the lead termination areas TA-1 and TA-2 are located at the outer periphery of the network roll 20r, since the outer turns of the roll are covered during the above-described solder spraying operation by the mask 25, and thus have no solder deposited thereon, it is difficult to achieve good electrical connections between the solder blocks 20 s and the convolutions of the metal layers 23 and 24 at the outer periphery of the roll. Thus, the disclosed embodiment of the of the invention is compatible with known processes for the manufacture of R-C networks, with the resistance pattern as disclosed in FIG. 1 inherently providing an arrangement for achieving good electrical connections between the metal layers 23 and 24 of the network 20 and the solder blocks 20s, so that the termination resistances $R_t$ are insignificant in value.

Figure 1:
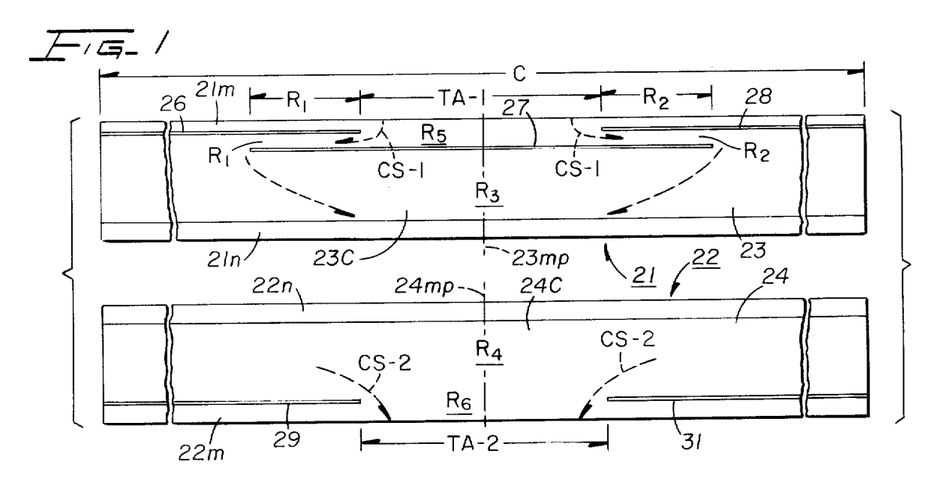
FIG. 1 illustrates the configuration of conductive paths on each of two layers of dielectric material employed in fabricating an R-C network in accordance with the invention.

The resistance paths $R_1$ and $R_2$ also are preferably located adjacent the metallized edge 21m of the dielectric strip 21, and thus adjacent one end of the network roll 20r, as illustrated in FIGS. 1 and 2, to insure that when the roll is wax impregnated the resistance paths will be covered with the anti-oxidant impregnating material. This insures that the metal forming the resistance paths $R_1$ and $R_2$ is protected against subsequent oxidation which could affect their resistance value so as to change the value of resistance in the finished R-C network 20. This also enables the resistance paths $R_1$ and $R_2$ to be located over the nonmetallized border portion 22n of the second dielectric strip 22 so that the metal forming the resistance paths has no capacitance effect in the circuit of the R-C network 20. Similarly, where the lines or gaps 29 and 31 in the second metal layer 24 on the second dielectric strip 22 are utilized, the metal in this metal layer outside these gaps (i.e., between the gaps and the adjacent metallized strip edge 22m) have no capacitance effect on the circuit of the R-C network 20, and the capacitance forming portions 23C and 24C of the metal layers 23 and 24 are located completely between the line or gap 27 on the first dielectric strip 21 and the lines or gaps 29 and 31 on the second dielectric strip 22. Further, the total resistance in the network 20 then is defined by the equal resistances $R_1$ and $R_2$, the smaller equal resistances $R_3$ and $R_4$, the equal but negligible resistances $R_5$ and $R_6$, and the equal but negligible termination resistances $R_t$, with the portions of the metal layers 23 and 24 between the lines or gaps 26, 28 and 29, 31 and the adjacent metallized edges 21m and 22m having no resistive effect in the network. Accordingly, a precise and stable resistance-capacitance series circuit, as illustrated in FIG. 5, is attained.

Figures 6, 7:
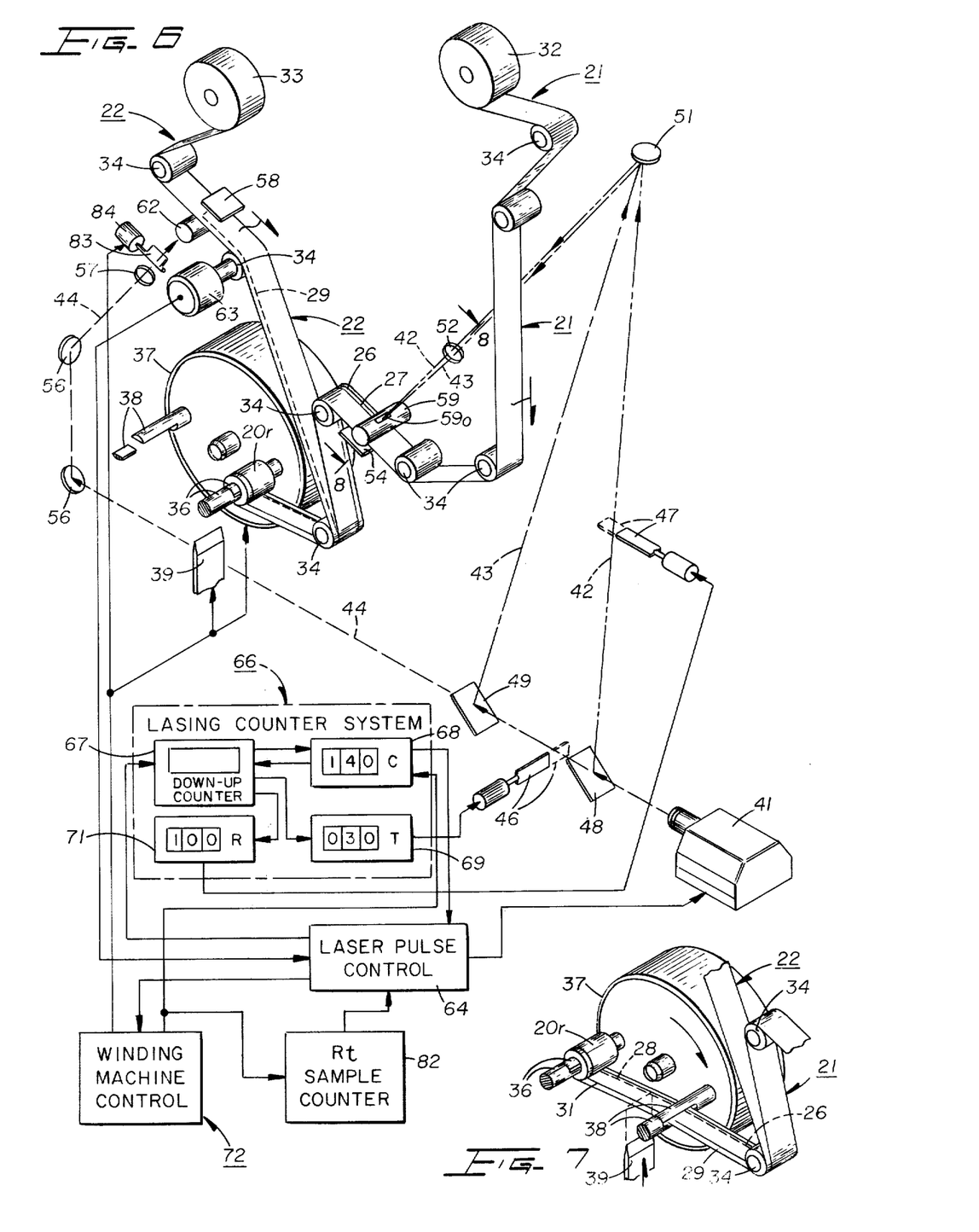
FIG. 6 is a schematic view of apparatus for fabricating R-C networks in accordance with the invention.
FIG. 7 is a schematic view of a portion of the apparatus shown in FIG. 6, in a second operating position.

Apparatus for winding the R-C network 20 in accordance with this invention may be of a conventional type, as illustrated schematically in FIG. 6, such as the Model 2Bd21 capacitor winder of the Metar Company, Fribourg, Switzerland, or the Model SAM 2901A capacitor winder of the E. W. Barton Company, San Fernando, California. Thus, in the disclosed apparatus the pair of metallized dielectric strips 21 and 22 are fed from respective supplies 32 and 33 about suitable guide rollers 34 and are initially wound upon a small diameter (0.080 inches) first arbor 36 of a split type wherein retractable opposed halves of the arbor have semicircular end portions which define a strip-receiving slot when in closed overlapping relationship. The retractable halves of the split arbor 36 are mounted on respective disc members (only one shown) of a rotatable turret 37, which also carries an identical retractable second split arbor 38. After a length of the strips 21 and 22 has been wound on the first arbor 36 to produce a network roll 20r of desired capacitance, the turret 37 is rotated 180° into the position shown in FIG. 7, and the arbor 38 closes to receive the strips in this arbor's slot. After the arbor 38 has made an initial winding turn to capture the strips 21 and 22 thereon against slippage through the arbor's slot, the strips 21 and 22 are cut by a blade 39. Winding of the trailing end of the network roll 20r on the arbor 36 then is completed, with the roll being wrapped in a plastic tape (not shown) to form an external insulating barrier for the strips 21 and 22, after which the arbor opens to strip the wound network roll therefrom.

In the disclosed embodiment of the invention, the lines 26–31 are removed from the metallized dielectric strips 21 and 22 by a laser system including a pulsed laser 41. The laser 41 may be of any suitable type capable of producing a beam which will heat, melt and evaporate the metal of the metal layers 23 and 24 up to the diameter of the beam (such as 6 mils), with the majority of the beam energy being transmitted through the dielectric strips 21 and 22, rather than being absorbed thereby. For example, where the dielectric strips 21 and 22 are of polyester plastic, which has a light energy transmission rate in excess of 90 percent at a wavelength on the order of 1.0 microns, a neodymium-doped yttrium aluminum garnet (Nd:YAG) laser, which has a wavelength of 1.06 microns, may be used. By then controlling the time period that the metallized dielectric strips 21 and 22 are exposed to the energy from the laser 41, the lines 26–31 of removed metal can be formed thereon without cutting through the strips.

To form the lines 26–31 of removed metal, a plurality of laser beams 42, 43 and 44, which may be selectively blocked by reciprocable shutters 46 and 47, are produced by directing the beam output of the laser 41 to a first beam-splitter mirror 48. The beam-splitter mirror 48 reflects a portion of the beam energy from the laser 41 to produce the laser beam 42, and passes a portion of the beam energy to a second beamsplitter mirror 49.

The beam-splitter mirror 49 reflects a portion of the passed beam energy to produce the laser beam 43 and passes another portion of the beam energy to produce the laser beam 44.

Figure 8:
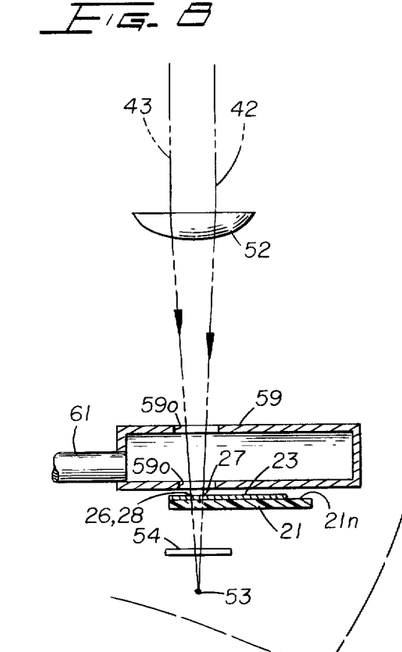
FIG. 8 is an enlarged cross-sectional view of a portion of the apparatus shown in FIG. 6, taken along the line 8—8.

The laser beams 42 and 43 are reflected by a mirror 51 through opposite sides of a beam converging lens 52. As is best shown in FIG. 8, the lens 52 then converges the two laser beams 42 and 43 toward a common focal point 53, with the lens 52 being located relative to the metallized dielectric strip 21 so that the focal point is on the opposite side of the strip. As a result, the laser beams 42 and 43 strike the metal layer 23 on the dielectric strip 21 in spaced relationship for the cutting of the lines or gaps 26, 27 and 28, and by adjusting the lens 52 toward and away from the strip the spacing of the line 27 from the lines 26 and 28 can be varied as desired. Laser beam energy passing through the dielectric strip 21 is absorbed by a suitable ceramic-gold diffusor 54.

The laser beam 44 is directed against the second metal layer 24 on the dielectric strip 22 through a system of reflecting mirrors 56, and is concentrated for forming the lines 29 and 31 in the metal layer by a suitable lens 57. As in the case of the dielectric strip 21, laser beam energy passing through the dielectric strip 22 is dissipated by a suitable ceramic-gold diffusor 58.

To avoid clouding the optic system (mirrors 48, 49, 51 and 56 and lenses 52, 57) of the apparatus by fumes produced as a result of the removal of metal from the metal layers 23 and 24, as is best shown in FIG. 8, the metallized dielectric strip 21 passes adjacent a cylindrical exhaust chamber 59 at the points of metal removal from the metal layer 23. The laser beams 42 and 43 then are directed against the metal layer 23 through upper and lower openings 59o in the exhaust chamber 59, and the resultant fumes are drawn into the exhaust chamber through the lower opening and out of the chamber by an exhaust line 61. Similarly, the dielectric strip 22 passes adjacent a cylindrical exhaust chamber 62 (FIG. 6), with the laser beam 44 being directed against the metal layer 24, through upper and lower aligned openings in this exhaust chamber.

Operation of the blocking shutters 46 and 47 to control the laser beams 42, 43 and 44, and thus the forming of the lines or gaps 26–31 in the metal layers 23 and 24, may be accomplished in any suitable manner, such as by a control system responsive to the travel of the metallized dielectric strips 21 and 22. For example, as is illustrated schematically in FIG. 6, the control apparatus may include a pulse generator or encoder 63 which is mechanically linked to the travel of the dielectric film 22, such as by being connected to one of the guide rollers 34 so as to be driven by the film through friction, to produce pulses in accordance with the speed of travel of the film. These pulses are transmitted to a laser pulse control circuit 64, which feeds corresponding pulse signals to a lasing counter system 66. The lasing counter system 66 may be of any conventional type capable of producing control signals to the reciprocable shutters 46 and 47 upon reaching preselected counts in response to the pulses, but preferably includes a "down-up" type counter 67, a "unit length" switch 68, and a "first line" or "lead termination path length" switch 69, and a "second line" or "resistance path length" switch 71. Since the capacitance value of the network 20 being wound is dependent upon the amount of film wound into the network, the "unit length" switch 68 controls the capacitance of the network. Further, the "first line" switch 69 determines the size of the lead termination areas TA-1 and TA-2 for the metallized dielectric films 21 and 22, and the "second line" switch 71 controls the resistance values $R_1$ and $R_2$.

Figure 9:
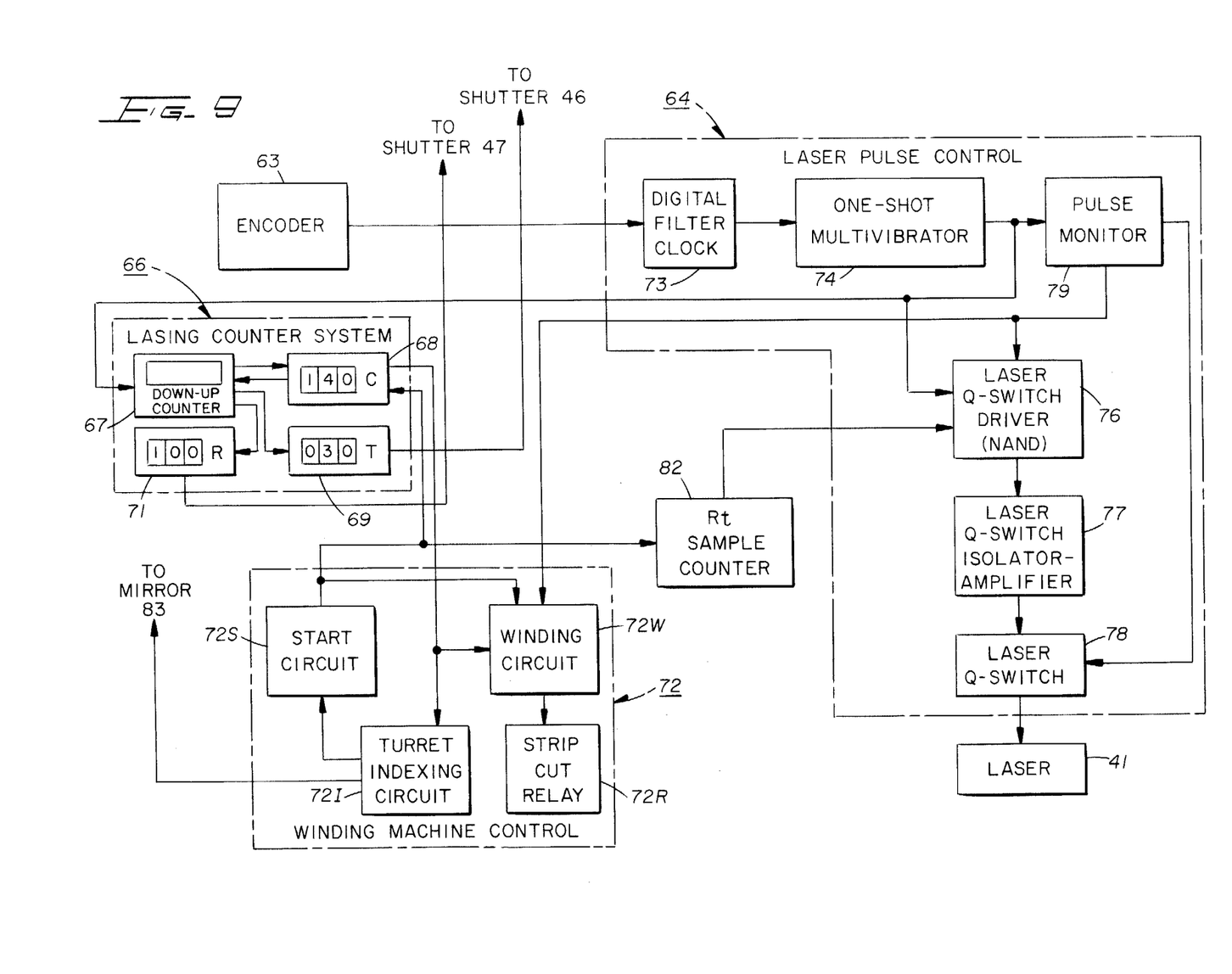
FIG. 9 is a block diagram of a control circuit for the apparatus shown in FIG. 6.

More specifically, referring to FIGS. 6 and 9, upon actuation of a start circuit 72S (FIG. 9) which energizes a winding circuit 72W (FIG. 9) in a winding machine control circuit 72, a signal from the start circuit also causes a "unit length" count number (e.g., 140) corresponding to ½ the total unit length desired, and which has been manually preset in the switch 68, to be loaded from the switch into the down-up counter 67, and the counter begins counting from this number down toward zero. The laser 41 also is then energized by pulses from the encoder 63, through the laser pulse control circuit 64, and the laser beam 43 begins removal of metal along the first line 26 (FIG. 1) of the first dielectric strip 21. At the same time, the laser beam 44, when utilized, begins metal removal along the line 29 of the second dielectric strip 22.

When the counter 67 goes below a second intermediate preset count number (e.g., 100) in the resistance path control switch 71, as determined by a comparator circuit in the counter, removal of metal from the first dielectric strip 21 is initiated along the second line 27 (FIG. 1) by this switch operating to cause retraction of the shutter 47 so that the laser beam 42 strikes the strip, thus beginning the forming of the first resistance path $R_1$. When the counter 67 goes below a subsequent lower preset number (e.g., 30) in the lead termination path switch 69, as determined by a second comparator circuit in the counter, the shutter 46 is advanced by operation of this switch to block the laser beams 43 and 44, and metal removal along the lines 26 and 29 (FIG. 1) is temporarily interrupted to begin forming of the lead termination areas TA-1 and TA-2.

When the counter 67 reaches a zero count level it automatically reverses its counting direction and counts upward towards the initial preset number (140) in the "unit length" switch 68. When the count of the counter 67 becomes greater than the lower preset count number (30) in the switch 69, the shutter 46 now is retracted in response to operation of this switch to permit the laser beams 43 and 44 to resume metal removal from the dielectric strips 21 and 22 along the lines 28 and 31, and thus the forming of the second resistance path $R_2$. When the counter 67 again passes above the intermediate preset count number (100) in the switch 71, metal removal along the line 27 is terminated by operation of this switch and the resultant advancing of the shutter 47 back into blocking position with respect to the laser beam 42. Finally, when the pulse count again reaches the initial loaded number (140) in the "unit length" switch 68, as determined by a third comparator circuit in the counter, the counter generates an output to the winding circuit 72W (FIG. 9) and an indexing circuit 72I (FIG. 9) of the winding machine control circuit 72, to terminate winding of the dielectric strips 21 and 22 and to cause indexing of the turret 37. The turret indexing circuit 72I then applies a "restart" signal to the start circuit 72, and the cycle is repeated, with the winding circuit 72W, immediately after the arbor 38 has captured the strips 21 and 22 as above described, actuating a strip out relay 72R in a conventional manner.

An advantage of the counter system 66, in which the counter 67 counts down through zero and then back up to the initial starting count, in comparison to a system in which the counter always starts at zero, is that is requires only three control switches (68, 69 and 71) and control settings to achieve the desired control functions described, resulting in a system which is relatively simple and easy to use. The system also permits the setting of any one of the switches 68, 69 and 71 to be changed independently to vary the capacitance or resistance of the network 20, without having to change the settings of the other switches.

Referring to FIGS. 6 and 7, it is seen that in the removal of metal from the dielectric strips 21 and 22 by the laser beams 43 and 44, the lasing of the lines 26 and 29 on each cycle starts to the right of the point at which the strips are cut by the blade 39. Accordingly, the lased lines 26–31 are not exactly symmetrical with respect to the longitudinal midpoints 23mp and 24mp (FIG. 1) of the metal layers 23 and 24; however, the discrepancy with respect to the total length of the wound network 20 is so minor as to be immaterial from a practical standpoint.

Instead of manually presetting a fixed count number into a switch such as the resistance control switch 71, the resistivity of the metal layer 23 on the first dielectric strip 21 can be determined on line prior to the winding of each network unit 20, and this value then used to control the removal of metal along the second line 27 of the strip. For example, this can be accomplished by engaging the metal layer 23 of the strip 21 with a pair of spaced roller contacts, and measuring the resistivity of the metal layer using a digital voltmeter, the output of which can be equated to the length of the resistance paths $R_1$ and $R_2$ which should be formed in the strip to obtain a desired resistance. The voltmeter, through suitable circuitry, then can generate a number which can be loaded directly into a comparator circuit in the counter 67 and utilized in the same manner as the number preset in the switch 71, to control the operation of the shutter 47 and thus obtain the desired metal removal from the dielectric strip 21.

With reference to FIG. 6, the speed of advancement of the metallized plastic strips 21 and 22 varies from zero to winding speed on each winding cycle. Thus, since point exposure of one of the plastic strips 21 or 22 to laser energy for an excessive time period will cause burning through the strip, the laser control circuit 64 synchronizes the pulsing of the laser 41 with the speed of the strips, to overlap the laser pulses on the order of 60 percent, so as to remove the lines of metal 26–31 from the strips without this occurring.

Accordingly, referring to FIG. 9, during a network forming operation the output pulses of the encoder 63 feed to a digital filter clock 73, which passes low frequency pulses while filtering out extraneous high frequency signals which could have an adverse effect on the system. The digital filter clock 73 sequentially triggers a pulse shaper in the form of a one-shot multivibrator 74, the square wave output of which splits to energize the lasing counter system 66, as above-described, and a laser Q-switch driver 76 (e.g., NAND gate). The driver 76, through an isolator-amplifier 77, as for example of a type known in the art as an optical photocoupler level shifter, then triggers a Q-switch 78 of the laser 41, to synchronize pulsing of the laser with the speed of the metallized dielectric strips 21 and 22.

During a lasing operation, the square wave output of the multivibrator 74 also is applied to a pulse monitor circuit 79, which verifies that the multivibrator is functioning properly. Further, since the laser 41 cannot properly remove metal from the metallized dielectric strips 21 and 22 if the strips are being advanced at an excessive speed, the pulse monitor detects when this condition has occurred. For this purpose, the digital filter clock 73 is set so that it does not pass frequency signals above a preselected value (e.g., 15,000 cps for a metal layer 1/1,000,000 inch thick) corresponding to the maximum permissible speed of the strips 21 and 22. Thus, if for some reason the speed of the strips 21 and 22 should reach a point where the pulse frequency from the encoder 63 exceeds this value, the output of the digital filter clock 73 drops to zero. The pulse monitor 79, upon receiving no input signals from the one-shot multivibrator 74, then produces an output signal which inhibits operation of the laser Q-switch driver 76 and energizes a stop latching relay (not shown) in the winding circuit 72W of the winding machine control circuit 72 to shut down the apparatus. In order that the winding machine 32–39 can begin each winding cycle to deliver pulses to the pulse monitor circuit 79, the start circuit 72S is of a type which locks in for a sufficient time period at the beginning of each cycle for this to occur, in a manner well known to those skilled in the art.

Preferably, in order to provide a control on whether the solder blocks 20s are subsequently being attached to the wound network rolls 20r so that the termination resistances $R_t$ are below a preselected maximum limit, it is desirable to wind network rolls periodically without performing any lasing of the metallized dielectric strips 21 and 22. Accordingly, at the beginning of each winding cycle the winding machine start circuit 72S feeds a pulse to an $R_t$ sample counter 82. The $R_t$ sample counter 82, upon reaching a preselected count, applies an inhibit signal to the laser Q-switch driver 76, whereby the laser 41 is not pulsed on that winding cycle and no lasing of the network roll 20r being wound takes place. The resultant blank network roll 20r, after having its solder blocks 20s subsequently spray soldered thereon, then can be tested for effective series resistance and if this resistance is excessive, indicating that a poor electrical connection probably exists between the spray soldered blocks and the termination areas TA-1 and TA-2 of the roll, corrective action can be taken at this phase of the manufacturing operation, as required.

Figure 10:
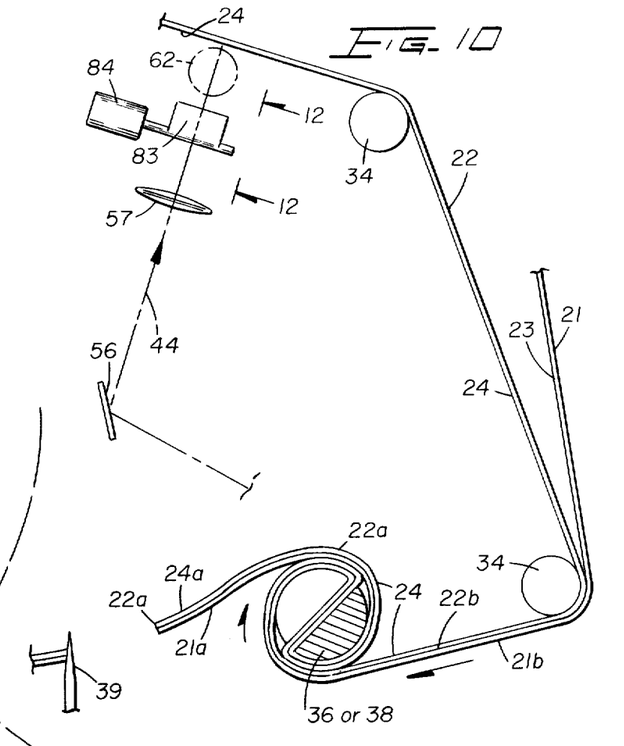
FIGS. 10, 11 and 12 are schematic views illustrating the manner in which a possible shorted condition in an R-C network of the type shown in FIGS. 1–4, is precluded in accordance with the subject invention.
Figure 11:
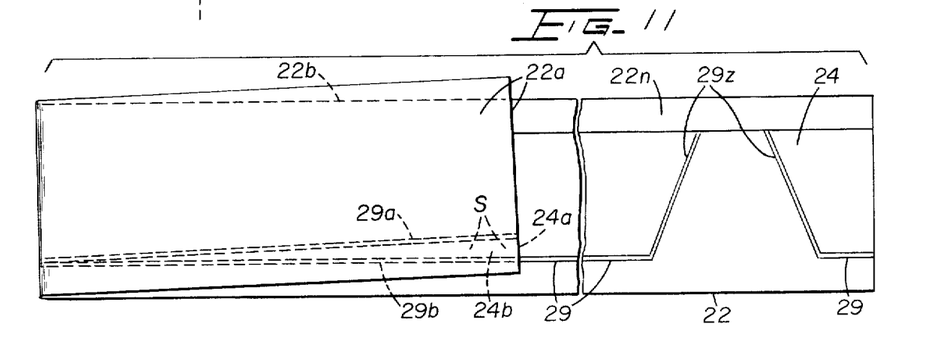

Referring to FIG. 10, in the disclosed embodiment of the invention, in which the metallized dielectric strips 21 and 22 are wound metal side in on the winding arbors 36 or 38, when leading end portions 21a and 22a of the strips between the functional arbor and the cutter blade 39 are reverse-lapped on the arbor, an adjacent portion 22b of the dielectric strip 22 subsequently becomes wrapped around and lapped over the leading end portion 22a with portions of the metal layer 24 in direct engagement. (If the strips 21 and 22 are wound metal side out, a similar condition occurs with leading end portions 21a and 21b of the strip 21 and the metal layer 23 thereon.) Thus, as if illustrated in planar unrolled relationship in the left-hand portion of FIG. 11, unless sections 29a and 29b of the lased line 29 in the engaged and overlapped strip portions 22a and 22b exactly coincide, a portion 24a of the metal layer 24 between the lased line and the edge of the strip may overlap and engage a capacitance forming portion 24b of the layer to form an electrical short S therebetween. Accordingly, referring to FIGS. 6, 10 and 12, a pivotable mirror 83 is mounted adjacent the path of the laser beam 44, and as the winding machine begins its index cycle the mirror is temporarily pivoted by a suitable actuating device 84 in response to a signal from the indexing circuit 72I, to intercept and deflect the laser beam transversely across the strip 22, as illustrated by the broken line 44d in FIG. 12. This removes a zig-zag line 29z of metal from the strip 22, as illustrated in FIG. 11, to electrically isolate the portion of the metal layer 24 extending between the lased zig-zag line and the cutter blade 39 from the remainder of the metal layer. Since this isolated metal layer portion is short relative to the entire length of the wound network roll 20r, however, its removal electrically from the network roll has no significant effect upon the capacitance value of the finished R-C network 20.

It is known that as the pulse rate of a laser increases, the peak power of the pulses decreases, whereby the width of the lines of metal 26, 27 and 28 removed from the metallized strip 21 also will decrease slightly, thus changing the width of the resistance paths $R_1$ and $R_2$ (FIGS. 1 and 2) formed therebetween. In certain instances, where the resistance paths $R_1$ and $R_2$ are very narrow, this variation in width could have an adverse effect upon their final resistance values. Accordingly, suitable circuitry (not shown) also may be provided to vary the power input to the laser 41 in response to changes in its pulse frequency, to maintain the beam output of the laser constant so that the lines 26 and 27 of removed metal will be of constant width.

In summary, a new and improved wound R-C network 20 having stable frequency response over a wide frequency range (e.g., 60 cycles to 100 kilohertz), in that it exhibits a uniform degree of capacitance at least at the lower frequencies (e.g., up to 10 kilohertz) and a uniform effective series resistance at the higher frequencies (e.g., above 10 kilohertz), has been provided. Forming the wound R-C network 20 of the wound metallized dielectric strips 21 and 22 while scribing the lines or gaps 26, 27, 28, 29 and 31 in the metal layers 23 and 24 to form the resistance paths $R_1$ and $R_2$ and the lead termination areas TA-1 and TA-2, also produces a network which is compact in size and which can readily be fabricated at low cost.

More specifically, forming the demetallized lines 26, 27 and 28 in the metal layer 23 on the dielectric strip 21 so that the resistance paths $R_1$ and $R_2$ extend circumferentially on opposite sides of the strip's longitudinal midpoint 23mp, with the resistance paths of equal length and width, and thus essentially of equal resistance value, produces a symmetrical configuration which facilitates uniform effective series resistance at high frequencies. This resistance pattern configuration also produces the lead termination area TA-1 in radially spaced intermediate relationship to the center and outer periphery of the network roll 20, thus inherently providing an arrangement for achieving a good electrical connection between the metal layer 23 of the network roll and the associated solder block 20s. Locating the resistance paths $R_1$ and $R_2$ adjacent one side of the metallized dielectric strip 21 also helps insure that the paths are covered with impregnating material to protect the metal forming the paths against subsequent oxidation which could affect their resistance value and thereby change the value of resistance in the finished network 20. This also enables the resistance paths $R_1$ and $R_2$ to be located over the non-metallized border portion 22n of the second dielectric strip 22 so that the metal forming the resistance paths has no capacitance effect on the circuit of the R-C network 20.

Figure 12:
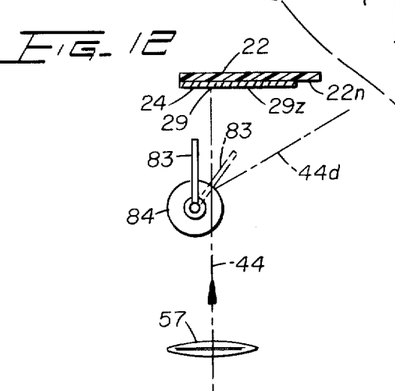

Similarly, where the lines or gaps 29 and 31 in the second metal layer 24 on the second dielectric strip 22 are utilized to obtain more stable electrical response at high frequencies, the forming of these lines in opposed parallel relationship to the lines 26 and 28 in the metal layer 23 of the dielectric strip 21, provides the second termination area TA-2 in opposed symmetry to the first termination area TA-1 and facilitates the establishing of a good electrical connection between the metal layer 24 and its associated solder block 20s. Locating the lines or gaps 29 and 31 adjacent the edge of the second dielectric strip over the nonmetallized border portion 21n of the first strip, also provides a construction in which only the internal portions 23C and 24C of the metal layers 23 and 24 (between the resistance forming line 27 on the first dielectric strip 21 and the current steering path lines 29 and 31 on the second dielectric strip 22) contribute to the capacitance of the network 20. The total resistance in the network 20 also is defined only by the equal resistances $R_1$ and $R_2$, the relatively small and thus essentially equal resistances $R_3$ and $R_4$, the equal but insignificant resistances $R_5$ and $R_6$, and the equal but insignificant termination resistances $R_t$, with the portions of the metal layers 23 and 24 outside the current steering path forming lines or gaps 26, 28 and 29, 31 (i.e., between these lines and the adjacent layer edges) having no resistive effect in the network. Further, forming the zig-zag line 29z, as illustrated in FIGS. 10, 11 and 12, to isolate the metallized strip portions 22a and 22b from the remainder of the strip, precludes the possibility of the short S (FIG. 11) being formed between the metal portions 24a and 24b as a result of a mismatch of the laser scribed sections 29a and 29b. Accordingly, a precise and stable resistance-capacitance series circuit, as illustrated in FIG. 5, is attained.

What is claimed is:

1. A resistor-capacitor network in the form of a roll having first and second layers of convoluted electrically conducting material separated by first and second layers of convoluted dielectric material to define a capacitance, which comprises:
    first and second elongated resistance paths in said first layer of electrically conducting material extending from a lead termination area defined by said first layer of electrically conducting material at one end of the network roll, circumferentially in opposite directions to connect said lead termination area to an inwardly spaced capacitance-reforming portion of said first layer of electrically conducting material.

2. A resistor-capacitor network as recited in claim 1, in which:
    said resistance paths are located in a portion of said first layer of electrically conducting material which is in non-overlapped relationship to said second layer of electrically conducting material.

3. A resistor-capacitor network as recited in claim 1, which further comprises:
    a current steering path connecting said lead termination area to said first and second resistance paths, said current steering path and said lead termination area being located on intermediate convolutions of said first layer of electrically conducting material in radially spaced relationship to the center and the outer periphery of the network roll.

4. A resistor-capacitor network as recited in claim 3, in which:
said first and second resistance paths have resistances of equal value.

5. A resistor-capacitor network as recited in claim 3, in which:
said first and second resistance paths are of equal length and width.

6. A resistor-capacitor network as recited in claim 3, which further comprises:
a second lead termination area and a second current steering path each located on intermediate convolutions of said second layer of electrically conducting material adjacent an opposite end of the network roll in radially spaced relationship to the center and the outer periphery of the network roll, said second current steering path connecting said second lead termination area to an inwardly spaced capacitance-forming portion of said second layer of electrically conducting material.

7. A resistor-capacitor network as recited in claim 6 having inner end portions of fone of said layers of electrically conducting material in reverse-lapped engagement with one another, in which:
said reverse-lapped and engaged inner end portions of said layer of electrically conducting material are electrically isolated from substantially the entire remainder of said layer.

8. A resistor-capacitor network roll in which alternate layers of dielectric and electrically conductive material and convoluted to produce a capacitance, characterized in that:
at least one layer of the convoluted electrically conductive material has first and second continuous elongated gaps extending lengthwise from adjacent respective ends of the electrically conductive material and terminating at points intermediate the ends of the material in spaced relationship to define a current steering path between the gaps; and
said one layer of electrically conductive material has a third continuous elongated gap extending lengthwise between points spaced inward from the ends of the material, in parallel spaced relationship with respect to portions of the first and second gaps in the material and the current steering path defined by the spaced ends of the first and second gaps, to define first and second elongated resistance paths of desired resistance values in said one layer of electrically conductive material.

9. A resistor-capacitor network roll as recited in claim 8, in which:
the first and second continuous gaps in said one layer of convoluted electrically conductive material are in circumferential alignment.

10. A resistor-capacitor network roll as recited in claim 8, in which:
said one layer of convoluted electrically conductive material extends to one end of the network roll and is spaced inward from the opposite end of the network roll; and
the first, second and third continuous gaps in said one layer of convoluted electrically conductive material are located closer to the one end of the network roll than to the opposite end of the network roll.

11. A resistor-capacitor network roll as recited in claim 10, in which:

the first and second continuous gaps in said one layer of convoluted electrically conductive material are spaced inward from the one end of the network roll; and
the third continuous gap in said one layer of electrically conductive material is spaced further inward from the first and second continuous gaps in the electrically conductive material.

12. A resistor-capacitor network roll as recited in claim 11, in which:
said first, second and third continuous gaps in said one layer of electrically conductive material are substantially symmetrical on opposite sides of the midpoint of the layer.

13. A resistor-capacitor network roll as recited in claim 11, further characterized in that:
a second layer of the convoluted electrically conductive material, which is spaced from the one end of the network roll and which extends to the opposite end of the network roll, has first and second continuous gaps extending lengthwise from adjacent respective ends of the electrically conductive material in generally circumferential alignment and closely spaced relationship to the second end of the network roll and terminating at points intermediate the ends of the material in spaced relationship to define a current path between the gaps adjacent the second end of the network roll.

14. A resistor-capacitor network roll as recited in claim 13, wherein inner end portions of one of said layers of electrically conducting material are in reverse-lapped engagement, further characterized in that:
said one layer of electrically conducting material has a gap extending transversely across said layer to electrically isolate the inner end portions of said layer from substantially the entire remainder of said layer.

15. The method of forming a wound resistor-capacitor network roll, wherein alternate layers of dielectric and electrically conductive material are advanced and wound into a convoluted configuration to form a capacitance, which comprises:
initially forming an elongated first gap in at least one layer of the advancing electrically conductive material during the winding of the alternate layers of dielectric and electrically conductive material;
subsequently initiating the forming of an elongated second gap in the one layer of advancing electrically conductive material, in spaced parallel relationship to the first gap, to define a first resistance path in the one layer of electrically conductive material;
terminating the forming of the first gap in the one layer of advancing electrically conductive material while continuing to form the second gap in the material, to provide the first resistance path with a resistance of a desired value;
initiating the forming of a third gap in the one layer of advancing electrically conductive material in spaced parallel relationship to the second gap and on the same side of the second gap as the first gap, to define a second resistance path in the material; and
terminating the forming of the second gap in the one layer of advancing electrically conductive material, to provide the second resistance path with a resistance of a desired value.

16. The method of forming a wound resistor-capacitor network roll, as recited in claim 15, in which:
   the first and third gaps are formed in the one layer of the advancing electrically conductive material in closely spaced parallel relationship to one edge of the layer so that the portion between the gaps defines a current path and a lead termination area for the adjacent end of the wound network roll; and
   the second gap is formed in the one layer of electrically conductive material along a line spaced inward from the first and third gaps.

17. The method of forming a wound resistor-capacitor network roll, as recited in claim 16, in which:
   the gaps are formed in the one layer of advancing electrically conductive material substantially symmetrically on opposite sides of the longitudinal midpoint of the material.

18. The method of forming a wound resistor-capacitor network roll, as recited in claim 16, which further comprises:
   forming gaps in a second layer of the advancing electrically conductive material simultaneously with the forming of the first and third gaps in the first layer of advancing electrically conductive material, and co-extensively with the first and third gaps in the first layer of material, but in closely spaced relationship to an outer edge of the second layer on an opposite side of the advancing layers, to produce a lead termination area on the opposite end of the wound network roll.

19. The method of forming a wound resistor-capacitor network roll, as recited in claim 17, wherein inner end portions of one of said layers of electrically conducting material are reverse-lapped into engagement with one another, which further comprises:
   forming a gap in said layer of electrically conducting material transversely across the layer to electrically isolate the inner end portions of said layer from substantially the entire remainder of said layer.

* * * * *